(12) United States Patent
Yamazaki (10) Patent No.: US 9,764,731 B2
(45) Date of Patent: Sep. 19, 2017

(54) HYBRID VEHICLE

(71) Applicant: TOYOTA JIDOSHA KABUSHIKI KAISHA, Toyota-shi, Aichi-ken (JP)

(72) Inventor: Makoto Yamazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/148,043

(22) Filed: May 6, 2016

(65) Prior Publication Data

US 2016/0325731 A1 Nov. 10, 2016

(30) Foreign Application Priority Data

May 8, 2015 (JP) .................. 2015-095531

(51) Int. Cl.
| | |
|---|---|
| *B60W 20/15* | (2016.01) |
| *B60K 6/48* | (2007.10) |
| *B60W 20/40* | (2016.01) |
| *B60K 6/445* | (2007.10) |
| *B60W 20/16* | (2016.01) |
| *B60W 30/18* | (2012.01) |

(52) U.S. Cl.
CPC ............ *B60W 20/15* (2016.01); *B60K 6/445* (2013.01); *B60K 6/48* (2013.01); *B60W 20/16* (2016.01); *B60W 20/40* (2013.01); *B60W 30/18109* (2013.01); *B60W 2510/0676* (2013.01); *B60W 2710/0627* (2013.01)

(58) Field of Classification Search
CPC ........ B60W 20/15; B60W 6/48; B60W 20/40; B60W 10/06; B60W 20/108
See application file for complete search history.

(56) References Cited

U.S. PATENT DOCUMENTS

| | | | | |
|---|---|---|---|---|
| 7,753,818 B2* | 7/2010 | Kamada | .................. | B60K 6/445 475/153 |
| 8,224,558 B2* | 7/2012 | Katou | .................. | F02D 13/0211 123/325 |
| 8,271,168 B2* | 9/2012 | Sawada | .................... | F16H 59/72 701/56 |
| 8,302,581 B2* | 11/2012 | Nishikiori | ........... | F02D 41/0082 123/434 |
| 8,306,721 B2* | 11/2012 | Maruyama | ............. | B60K 6/445 123/434 |
| 8,688,337 B2* | 4/2014 | Takanami | .............. | B60W 10/06 180/65.28 |
| 8,706,374 B2* | 4/2014 | Takiguchi | ............. | B60W 10/06 180/170 |

(Continued)

FOREIGN PATENT DOCUMENTS

| | | |
|---|---|---|
| JP | 2006-258007 | 9/2006 |
| JP | 2010-43543 | 2/2010 |

*Primary Examiner* — Hau Phan
(74) *Attorney, Agent, or Firm* — Finnegan, Henderson, Farabow, Garrett & Dunner, LLP (57) ABSTRACT

During deceleration with operation of an engine, an amount of wall surface deposition is estimated to tend to increase with a decrease in corrected operation time that is based on an operation time of the engine. A target amount of fuel injection is set by adding a correction value that is set according to a variation in the amount of wall surface deposition to a base amount of fuel injection. Fuel injection control of the engine is performed by using the set target amount of fuel injection.

5 Claims, 8 Drawing Sheets

(56) References Cited

U.S. PATENT DOCUMENTS

| | | | | |
|---|---|---|---|---|
| 8,904,761 B2 * | 12/2014 | Amano | ................ | B60K 6/445 |
| | | | | 60/285 |
| 8,914,178 B2 * | 12/2014 | Yamazaki | .............. | B60K 6/445 |
| | | | | 701/22 |
| 8,972,089 B2 * | 3/2015 | Ando | ................ | B60W 20/108 |
| | | | | 123/179.3 |
| 9,008,877 B2 * | 4/2015 | Ando | ................ | F02D 41/1497 |
| | | | | 180/65.275 |
| 2006/0207241 A1 | 9/2006 | Araki et al. | | |

* cited by examiner

HYBRID VEHICLE

This application claims priority to Japanese Patent Application No. 2015-095531 filed 8 May 2015, the contents of which is incorporated herein by reference.

TECHNICAL FIELD

The present invention relates to a hybrid vehicle and more specifically relates to a hybrid vehicle equipped with an engine and a motor for driving.

BACKGROUND ART

A proposed fuel injection control apparatus for an engine corrects the amount of fuel injection that is to be injected from a fuel injection valve of an engine for driving, with a correction value that is set to provide a larger amount of fuel injection in the case of a larger increasing variation in amount of fuel depositing on a wall surface of an intake passage of the engine per unit time than in the case of a smaller variation (see, for example, Patent Literature 1). This proposed fuel injection control apparatus determines an attenuation correction term (tailing term) based on whether a motor vehicle equipped with the engine is during deceleration or not and sets the correction value using this attenuation correction term.

CITATION LIST

Patent Literature

PTL 1: JP 2010-43543A

SUMMARY OF INVENTION

Technical Problem

In a hybrid vehicle that is equipped with an engine and a motor for driving and runs with intermittent operation of the engine, performing the above control during operation of the engine may provide a smaller estimated value as the amount of fuel depositing on the wall surface of the intake passage of the engine (especially, an estimated value in the initial stage of deceleration) than the actual amount of fuel, in the process of reducing the amount of fuel injection during deceleration having a relatively short operation time of the engine. This is likely to decrease the reduction in amount of fuel per unit time (estimated value) to the smaller value than the actual reduction in amount of fuel per unit time. This is likely to cause insufficient reduction in the amount of fuel injection and is likely to provide a rich air-fuel ratio. Providing the rich air-fuel ratio during deceleration is likely to increase the non-combusted fuel and cause poor emission. There is accordingly a need to suppress the rich air-fuel ratio.

With regard to the hybrid vehicle, an object of the invention is to suppress the air-fuel ratio from becoming rich during deceleration having a relatively short operation time of an engine.

Solution of Problem

In order to achieve the object described above, the engine apparatus of the invention may be implemented by the following aspects.

According to one aspect of the invention, there is provided a hybrid vehicle including: an engine that is provided with a fuel injection valve to inject a fuel into an intake pipe and is configured to output a power for driving; a motor that is configured to output a power for driving; and a controller that is configured to control the engine and the motor such as to drive the hybrid vehicle with intermittent operation of the engine. The controller may set a target amount of fuel injection such as to provide a smaller value during a predetermined deceleration that is during deceleration of the hybrid vehicle with operation of the engine than a value during no-deceleration with operation of the engine, and control the engine to perform fuel injection with the target amount of fuel injection from the fuel injection valve. During the predetermined deceleration, the controller may set a sum of a base amount of fuel injection and a correction value that is set to reduce the target amount of fuel injection in a case of a larger reduction in amount of wall surface deposition per unit time than in a case of a smaller reduction in amount of wall surface deposition per unit time, to the target amount of fuel injection, wherein the amount of wall surface deposition denotes an amount of fuel depositing on a wall surface of the intake pipe. During the predetermined deceleration, the controller may estimate the amount of wall surface deposition to provide a larger value at a shorter operation time of the engine than a value at a longer operation time.

The hybrid vehicle of this aspect sets the target amount of fuel injection such as to provide a smaller value during the predetermined deceleration that is during deceleration with operation of the engine than a value during non-deceleration with operation of the engine, and controls the engine to perform fuel injection with the target amount of fuel injection from the fuel injection valve. During the predetermined deceleration, the sum of the base amount of fuel injection and the correction value that is set to reduce the target amount of fuel injection in the case of the larger reduction in amount of wall surface deposition per unit time than in the case of the smaller reduction in amount of wall surface deposition per unit time is set to the target amount of fuel injection. The amount of wall surface deposition may denote an amount of fuel depositing on a wall surface of the intake pipe. During the predetermined deceleration, the amount of wall surface deposition is estimated to provide a larger value at the shorter operation time of the engine than a value at the longer operation time. During deceleration having a relatively short operation time of the engine, accompanied with an increase in operation time of the engine, this increases the reduction in amount of wall surface deposition per unit time to the larger value and decreases the target amount of fuel injection to the smaller value, thus more effectively suppressing the air-fuel ratio from becoming rich. This suppresses the poor emission with an increase of non-combusted fuel during the deceleration. The amount of wall surface deposition may be an amount of fuel depositing on the wall surface of the intake pipe during control of the engine on the assumption that the operating state of the engine is ordinary state.

DESCRIPTION OF EMBODIMENTS

The following describes some aspects of the invention with reference to an embodiment.

Figure 1:
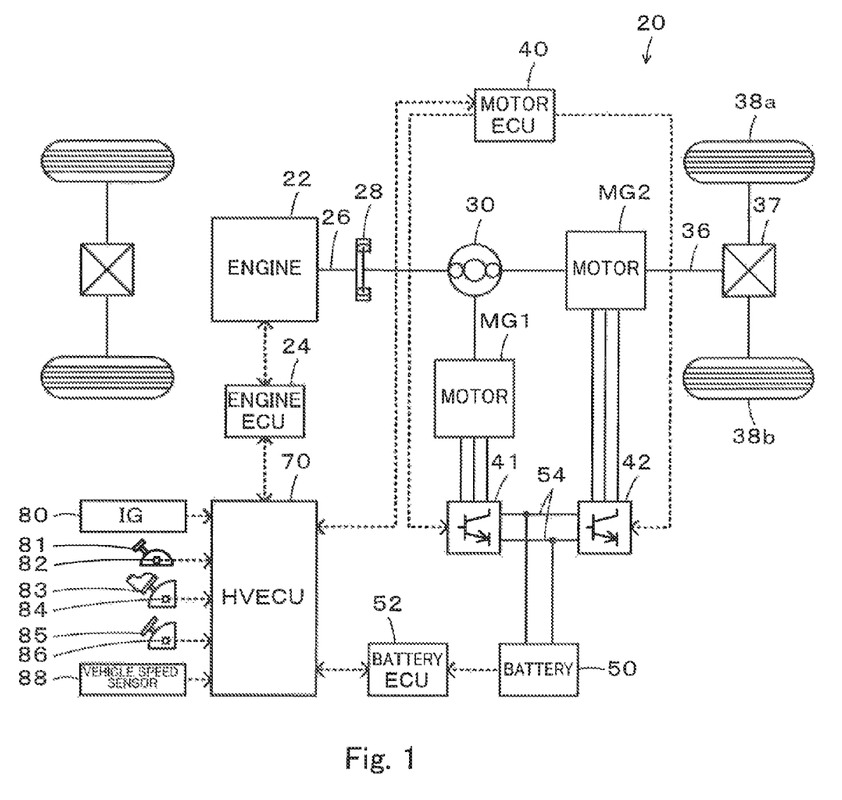
FIG. 1 is a configuration diagram illustrating the schematic configuration of a hybrid vehicle according to an embodiment of the invention.

FIG. 1 is a configuration diagram illustrating the schematic configuration of a hybrid vehicle 20 according to an embodiment of the invention. As illustrated, the hybrid vehicle 20 of the embodiment includes an engine 22, a planetary gear 30, motors MG1 and MG2, inverters 42 and 42, a battery 50 and a hybrid electronic control unit (hereinafter referred to as "HVECU") 70.

Figure 2:
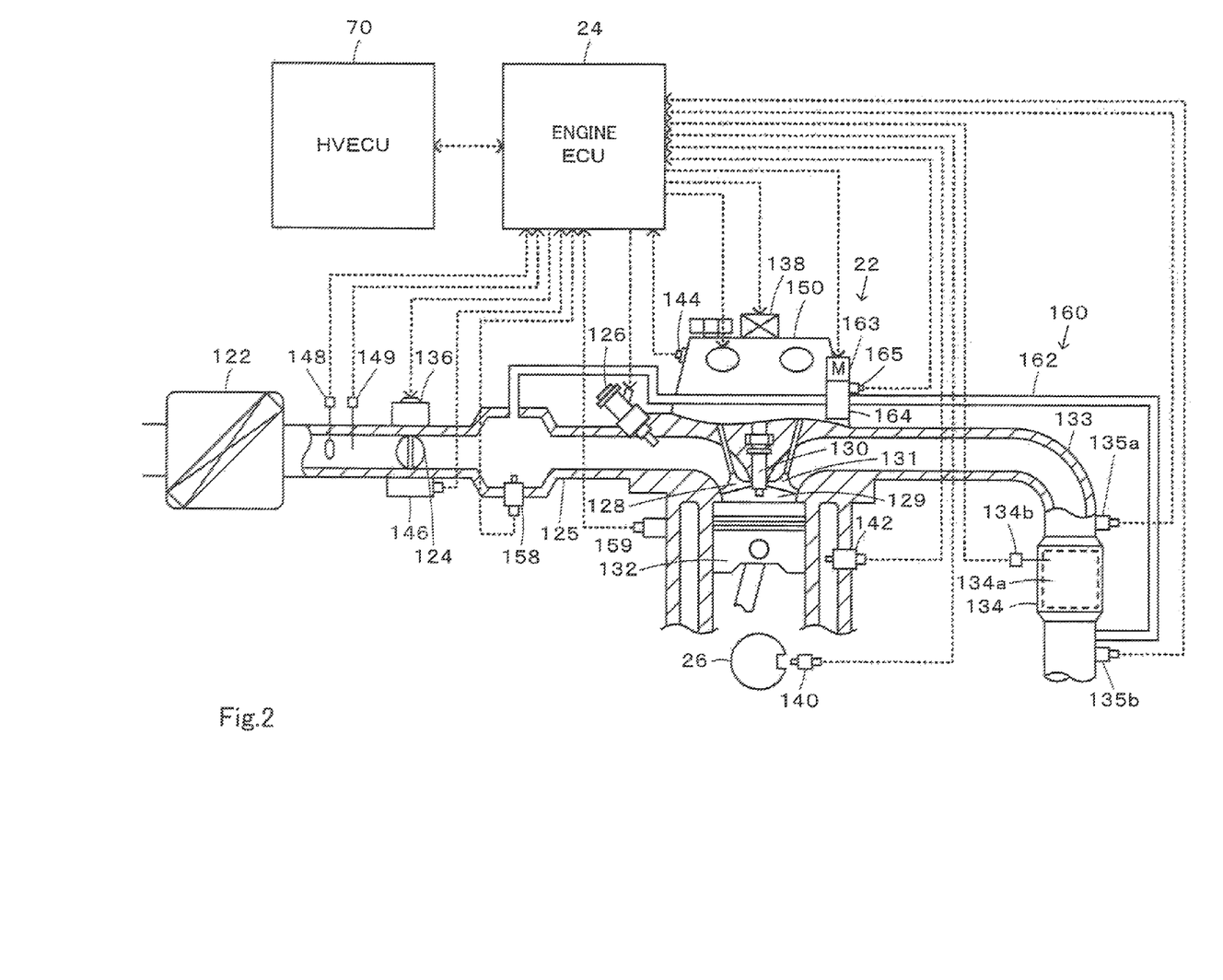
FIG. 2 is a configuration diagram illustrating the schematic configuration of an engine.

The engine 22 is configured as a four-cylinder internal combustion engine to output power in four strokes, i.e., intake, compression, expansion and exhaust, using, for example, gasoline or light oil as a fuel. FIG. 2 is a configuration diagram illustrating the schematic configuration of the engine 22. As illustrated, the engine 22 takes the air cleaned by an air cleaner 122 into an intake pipe 125, injects the fuel from fuel injection valves 126 into the intake pipe 125 and mixes the intake air with the fuel. The air-fuel mixture is sucked into a combustion chamber 129 via an intake valve 128. The sucked air-fuel mixture is explosively combusted with electric spark generated by a spark plug 130. The engine 22 converts the reciprocating motion of a piston 132 pressed down by the energy of explosive combustion into the rotational motion of a crankshaft 26. The exhaust as discharged from the combustion chamber 129 to an exhaust pipe 133 is released to the outside air through a catalytic converter 134 that is filled with a conversion catalyst (three-way catalyst) 134a to convert toxic components such as carbon monoxide (CO), hydrocarbons (HC) and nitrogen oxides (NOx) to less toxic components. The exhaust gas is not fully discharged to the outside air but is partly supplied to the intake pipe 125 via an exhaust gas recirculation system (hereinafter referred to as EGR system) 150 that is configured to recirculate the exhaust gas to the intake air. The EGR system 160 includes an EGR pipe 162 and an EGR valve 164. The EGR pipe 162 is connected downstream of the catalytic converter 134 and is used to supply the exhaust gas to the intake pipe 125. The EGR valve 164 is placed in the EGR pipe 162 and is driven by a stepping motor 153.

This EGR system 160 regulates the recirculation amount of the exhaust gas as uncombusted gas by adjusting the opening position of the EGR valve 164 and recirculates the regulated amount of the exhaust gas to the air intake system. The engine 22 is configured to suck the mixture of the air, the exhaust gas and the fuel into the combustion chamber 129.

The engine 22 is operated and controlled by an engine electronic control unit (hereinafter referred to as "engine ECU") 24. The engine ECU 24 is implemented by a CPU-based microprocessor and includes a ROM that stores processing programs, a RAM that temporarily stores data, input and output ports and a communication port other than the CPU, although not being illustrated. As shown in FIG. 2, the engine ECU 24 inputs, via its input port, signals from various sensors required for operation control of the engine 22. Examples of the signals from various sensors include:

crank angle θcr from a crank position sensor 140 configured to detect the rotational position of the crankshaft 26;

cooling water temperature Tw from a water temperature sensor 142 configured to detect the temperature of cooling water of the engine 22;

cam angles θci and θco from a cam position sensor 144 configured to detect the rotational position of an intake cam shaft that opens and closes the intake valve 128 and the rotational position of an exhaust cam shaft that opens and closes an exhaust valve 131;

throttle position TH from a throttle valve position sensor 146 configured to detect the position of the throttle valve 124 provided in the intake pipe 125;

amount of intake air Qa from an air flowmeter 148 mounted to the intake pipe 125;

intake air temperature Ta from a temperature sensor 149 mounted to the intake pipe 125;

intake pressure Pin from an intake pressure sensor 158 configured to detect the internal pressure of the intake pipe 125;

catalyst temperature Tc from a temperature sensor 134b configured to detect the temperature of the conversion catalyst 134a in the catalytic converter 134;

air-fuel ratio AF from an air-fuel ratio sensor 135a;

oxygen signal $O_2$ from an oxygen sensor 135b;

knocking signal Ks from a knocking sensor 159 mounted to a cylinder block and configured to detect a vibration induced by the occurrence of knocking; and EGR valve position from an EGR valve position sensor 165 configured to detect the opening position of the EGR valve 164.

The engine ECU 24 outputs, via its output port, various control signals for operation control of the engine 22. Examples of the various control signals include:

drive control signal to a throttle motor 136 configured to adjust the position of the throttle valve 124;

drive control signals to the fuel injection valves 126;

drive control signals to ignition coils 133 integrated with igniters;

control signal to a variable valve timing mechanism 150 configured to vary the open-close timing of the intake valve 128; and control signal to a stepping motor 163 configured to adjust the opening position of the EGR valve 164.

The engine ECU 24 is connected with the HVECU 70 via the respective communication ports to operate and control the engine 22 in response to control signals from the HVECU 70 and output data regarding the operating conditions of the engine 22 to the HVECU 70 as appropriate. The engine ECU 24 computes the rotation speed of the crankshaft 26 or, in other words, a rotation speed Ne of the engine 22, based on the crank angle θcr from the crank position sensor 140. The engine ECU 24 also computes an open-close timing VT of the intake valve 128, based on an angle (θci-θcr) that indicates the cam angle θci of the intake cam shaft from the cam position sensor 144 relative to the crank angle θcr from the crank position sensor 140. The engine ECU 24 further computes a volume efficiency (ratio of the volume of the air actually taken in one cycle to the stroke volume per cycle of the engine 22) KL as a load of the engine 22, based on the amount of intake air Qa from the air flowmeter 148 and the rotation speed Ne of the engine 22.

As shown in FIG. 1, the planetary gear 30 is configured as a single pinion-type planetary gear mechanism. The planetary gear 30 has a sun gear that is connected with a rotor of the motor MG1. The planetary gear 30 has a ring gear that is connected with a driveshaft 36 linked with drive wheels 38a and 38b via a differential gear 37. The planetary gear 30 has a carrier that is connected with the crankshaft 26 of the engine 22 via a damper 28.

The motor MG1 is configured, for example, as a synchronous motor generator and has the rotor that is connected with the sun gear of the planetary gear 30 as described above. The motor MG2 is configured, for example, as a synchronous motor generator and has a rotor that is connected with the driveshaft 36. The inverters 41 and 42 are connected with the battery 50 via power lines 54. The motors MG1 and MG2 are rotated and driven by switching control of a plurality of switching elements (not shown) of the inverters 41 and 42 by a motor electronic control unit (hereinafter referred to as "motor ECU") 40.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals from various sensors required for drive control of the motors MG1 and MG2. Examples of the signals from various sensors include:
  rotational positions θm1 and θm2 from rotational position detection sensors configured to detect the rotational positions of the rotors of the motors MG1 and MG2; and
  phase currents from current sensors configured to detect electric currents flowing through the respective phases of the motors MG1 and MG2.

The motor ECU 40 outputs, via its output port, for example, switching control signals to the switching elements (not shown) of the inverters 41 and 42. The motor ECU 40 is connected with the HVECU 70 via the respective communication ports. The motor ECU 40 drives and controls the motors MG1 and MG2, in response to control signals from the HVECU 70. The motor ECU 40 also outputs data regarding the driving conditions of the motors MG1 and MG2 to the HVECU 70 as appropriate. The motor ECU 40 computes rotation speeds Nm1 and Nm2 of the motors MG1 and MG2, based on the rotational positions θm1 and θm2 of the rotors of the motors MG1 and MG2 from the rotational position detection sensors.

The battery 50 is configured, for example, as a lithium ion secondary battery or a nickel metal hydride secondary battery and is connected with the inverters 41 and 42 via the power lines 54. The battery 50 is under management of a battery electronic control unit (hereinafter referred to as "battery ECU") 52.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs, via its input port, signals from various sensors required for management of the battery 50. Examples of the signals from various sensors include:
  battery voltage Vb from a voltage sensor placed between terminals of the battery 50;
  battery current Ib from a current sensor mounted to an output terminal of the battery 50; and
  battery temperature Tb from a temperature sensor mounted to the battery 50.

The battery ECU 52 is connected with the HVECU 70 via the respective communication ports. The battery ECU 52 outputs data regarding the conditions of the battery 50 to the HVECU 70 as appropriate. The battery ECU 52 computes a state of charge SOC, based on an integrated value of the battery current Ib from the current sensor. The state of charge SOC denotes a ratio of power capacity dischargeable from the battery 50 to the entire capacity of the battery 50. The battery ECU 52 also computes input and output limits Win and Wout, based on the computed state of charge SOC and the battery temperature Tb from the temperature sensor. The input and output limits Win and Wout denote maximum allowable electric powers chargeable into and dischargeable from the battery 50.

The HVECU 70 is implemented by a CPU-based microprocessor and includes a ROM that stores processing programs, a RAM that temporarily stores data, input and output ports and a communication port other than the CPU, although not being illustrated. The HVECU 70 inputs, via its input port, signals from various sensors. Examples of the signals from various sensors include:
  ignition signal from an ignition switch 80;
  shift position SP from a shift position sensor 82 configured to detect the operational position of a shift lever 81;
  accelerator position Acc from an accelerator pedal position sensor 84 configured to detect the depression amount of an accelerator pedal 83;
  brake pedal position BP from a brake pedal position sensor 86 configured to detect the depression amount of a brake pedal 85; and
  vehicle speed V from a vehicle speed sensor 88.

The HVECU 70 is connected with the engine ECU 24, the motor ECU 40 and the battery ECU 52 via the communication ports to transmit various control signals and data to and from the engine ECU 24, the motor ECU 40 and the battery ECU 52.

The hybrid vehicle 20 of the embodiment having the above configuration runs in a drive mode, such as hybrid drive mode (HV drive mode) or an electric drive mode (EV drive mode). The HV drive mode denotes a drive mode in which the hybrid vehicle 20 is driven with operation of the engine 22. The EV drive mode denotes a drive mode in which the hybrid vehicle 20 is driven with stopping operation of the engine 22.

During a run in the HV drive mode, the HVECU 70 first sets a required torque Tr* required for running (to be output to the driveshaft 36), based on the accelerator position Acc from the accelerator pedal position sensor 84 and the vehicle speed V from the vehicle speed sensor 88. The HVECU 70 subsequently multiplies the set required torque Tr* by a rotation speed Nr of the driveshaft 36 to calculate a driving power Pdrv* required for running. The rotation speed Nr of the driveshaft 36 used herein may be the rotation speed Nm2 of the motor MG2 or a rotation speed calculated by multiplying the vehicle speed V by a conversion efficiency. The HVECU 70 subtracts a charge-discharge power demand Pb* of the battery 50 (that takes a positive value in the case of discharging from the battery 50) from the driving power Pdrv* to calculate a required power Pe* required for the vehicle. The HVECU 70 then sets a target rotation speed Ne* and a target torque Te* of the engine 22 and torque commands Tm1* and Tm2* of the motors MG1 and MG2 such as to cause the required power Pe* to be output from the engine 22 and cause the required torque Tr* to be output to the driveshaft 36 within the range of the input and output limits Win and Wout of the battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs intake air flow control, fuel injection control, ignition control and open-close timing control of the engine 22, so as to operate the engine 22 based on the received target rotation speed Ne* and the received target torque Te*. The intake air flow control is performed by driving ad controlling the throttle motor 136. The fuel injection control is performed by driving and controlling the fuel injection valve 126. The ignition control is performed by driving and controlling the ignition coil 138. The open-close timing control is performed by driving and controlling the variable valve timing mechanism 150. When receiving the torque commands Tm1* and Tm2* of the motors MG1 and MG2, the motor ECU 40 performs switching control of the switching elements of the inverters 41 and 42, so as to drive the motors MG1 and MG2 with the torque commands Tm1* and Tm2*.

In this HV drive mode, for example, when the required power Pe* becomes equal to or less than a stop threshold value Pstop, the hybrid vehicle 20 determines that a stop condition of the engine 22 is satisfied, performs a stopping process of the engine 22 and shifts to the EV drive mode. The stopping process of the engine 22 terminates the operation control of the engine 22 (for example, fuel injection control and ignition control) and causes the engine 22 to be motored by the motor MG1 such as to decrease the rotation speed Ne of the engine 22.

During a run in the EV drive mode, on the other hand, the HVECU 70 first sets the required torque Tr*, as in the case of the NV drive mode. The HVECU 70 subsequently sets the torque command Tm1* of the motor MG1 to value 0, and sets the torque command Tm2* of the motor MG2 such as to output the required torque Tr* to the driveshaft 36 in the range of the input limit Win and the output limit Wout of the battery 50. The HVECU 70 then sends the torque commands Tm1* and Tm2* of the motors MG1 and MG2 to the motor ECU 40. When receiving the torque commands Tm1* and Tm2* of the motors MG1 and MG2, the motor ECU 40 performs switching control of the switching elements of the inverters 41 and 42 so as to drive the motors MG1 and MG2 with the torque commands Tm1* and Tm2*.

In this EV drive mode, for example, when the required power Pe* calculated as in the case of the HV drive mode becomes equal to or greater than a start threshold value Pstart that is larger than the stop threshold value Pstop, the hybrid vehicle 20 determines that a start condition of the engine 22 is satisfied, performs a starting process of the engine 22 and shifts to the HV drive mode. The starting process of the engine 22 causes the engine 22 to be motored by the motor MG1 such as to increase the rotation speed Ne of the engine 22 and starts the operation control of the engine 22 (for example, fuel in control and ignition control) when the rotation speed Ne of the engine 22 becomes equal to or higher than a predetermined rotation speed Nst (for example, 500 rpm, 300 rpm or 700 rpm).

Figure 3:
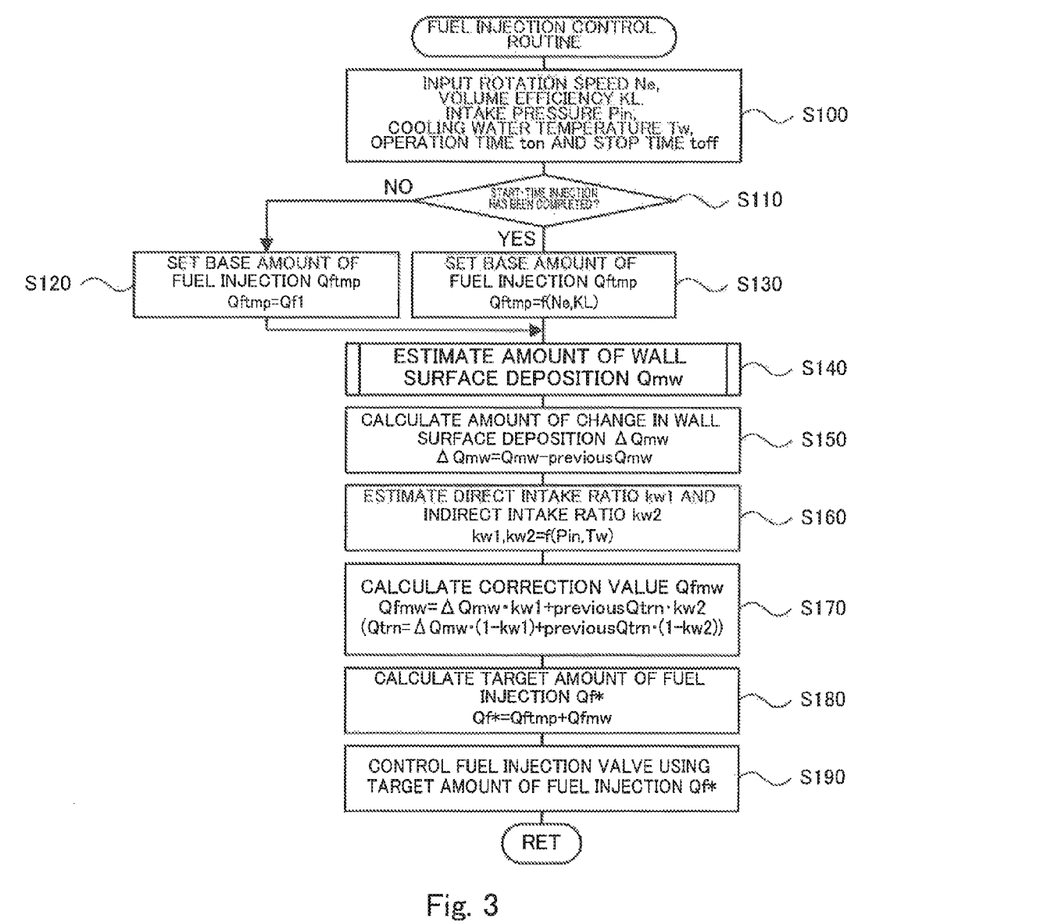
FIG. 3 is a flowchart showing one example of fuel injection control routine.

The following describes the operation of the hybrid vehicle 20 of the embodiment having the above configuration or more specifically fuel injection control of the engine 22. FIG. 3 is a flowchart showing one example of fuel injection control routine performed by the engine ECU 24 of the embodiment. This routine is performed repeatedly during operation of the engine 22.

On start of the fuel injection control routine, the engine ECU 24 first inputs data such as the rotation speed Ne, the volume efficiency KL, the intake pressure Pin, the cooling water temperature Tw, an operation time ton and a stop time toff of the engine 22 (step S100). The rotation speed Ne of the engine 22 input here is a value computed based on the crank angle θcr from the crank position sensor 140. The volume efficiency Kb input here is a value computed based on the amount of intake air Qa from the air flowmeter 148 and the rotation speed Ne of the engine 22. The intake pressure Pin input here is a value detected by the intake pressure sensor 158. The cooling water temperature Tw input here is a value detected by the water temperature sensor 142. The operation time ton input here is a value counted by a timer (not shown) as a time period elapsed since start of a current operation of the engine 22. The stop time toff input here is a value counted by a timer (not shown) as a time period between termination of previous operation of the engine 22 and start of current operation of the engine 22 (i.e. stop time of the engine 22).

After inputting the data, the engine ECU 24 determines whether start-time injection of the engine 22 has been completed (step S110). When it is determined that the start-time injection of the engine 22 has not yet been completed, the engine ECU 24 sets a predetermined injection amount Qf1 to a base amount of fuel injection Qftmp (step S120). The predetermined injection amount Qf1 denotes a value set to make the air-fuel ratio slightly lower than (slightly richer than) a target air-fuel ratio such as stoichiometric air-fuel ratio. In the description hereof, fuel injection control using a target amount of fuel injection Qf* based on this base amount of fuel injection Qftmp (=Qf1) is called "start-time injection". The start-time injection is started on start of fuel injection control of the engine 22 and is completed when fuel injection is performed with regard to a predetermined number of cylinders (for example, four, eight or twelve cylinders (i.e., the number of cylinders corresponding to two rotations, four rotations or six rotations of the engine 22)).

When it is determined at step S110 that the start-time injection of the engine 22 has been completed, on the other hand, the engine ECU 24 sets the base amount of fuel injection Qftmp, based on the rotation speed Ne and the volume efficiency KL of the engine 22 (step S130), and performs a series of processing of and after step S140. The base amount of fuel injection Qftmp in this case is an amount of fuel injection to make the air-fuel ratio of the engine 22 equal to the target air-fuel ratio. According to this embodiment, a procedure of setting the base amount of fuel injection Qftmp determines in advance a relationship of the base amount of fuel injection Qftmp to the rotation speed Ne and the volume efficiency KL of the engine 22 and stores the determined relationship in the form of a map in the ROM (not shown). The base amount of fuel injection Qftmp corresponding to a given rotation speed Ne and a given volume efficiency KL of the engine 22 is read from this map as a set value. The base amount of fuel injection Qftmp is set to provide a larger value at the higher rotation speed Ne of the engine 22 than a value at the lower rotation speed Ne and to provide a larger value at the higher volume efficiency KL of the engine 22 than a value at the lower volume efficiency KL. In other words, the base amount of fuel injection Qftmp is set to tend to increase with an increase in rotation speed Ne of the engine 22 and to tend to increase with an increase in volume efficiency KL of the engine 22.

The engine ECU 24 subsequently estimates an amount of wall surface deposition Qmw (step S140) and subtracts a previous amount of wall surface deposition (previous Qmw) from the estimated amount of wall surface deposition Qmw to calculate an amount of change in wall surface deposition ΔQmw (step S150). The amount of wall surface deposition Qmw denotes an amount of fuel depositing on the wall surface of the intake pipe 125 during fuel injection control on the assumption that the operation state of the engine 22 is ordinary state, and is estimated by a wall surface deposition amount estimation process described later according to the embodiment. The amount of change in wall surface deposition ΔQmw denotes a variation in amount of wall surface deposition Qmw during an interval of execution of this routine.

The engine ECU 24 subsequently estimates a direct intake ratio kw1 and an indirect intake ratio kw2, based on the intake pressure Pin and the cooling water temperature Tw of the engine 22 (step S160). The direct intake ratio kw1 denotes a ratio of the amount of fuel that does not deposit on the wall surface of the intake pipe 125 but is directly sucked into the combustion chamber 129 to the amount of fuel injection from the fuel injection valve 126. The indirect intake ratio kw2 denotes a ratio of the amount of fuel that is separated from the wall surface of the intake pipe 125 and is sucked into the combustion chamber 129 to the amount of fuel depositing on the wall surface of the intake pipe 125. According to this embodiment, a procedure of estimating the direct intake ratio kw1 and the indirect intake ratio kw2 determines in advance relationships of the direct intake ratio kw1 and the indirect intake ratio kw2 to the intake pressure Pin and the cooling water temperature Tw by experiment or by analysis and stores the determined relationships in the form of maps in the ROM (not shown). The direct intake ratio kw1 and the indirect intake ratio kw2 corresponding to a given intake pressure Pin and a given cooling water temperature Tw are read from these maps as estimated values.

The engine ECU 24 subsequently calculates a correction value Qfmw as the sum of a product of the amount of change in wall surface deposition ΔQmw and the direct intake ratio kw1 and a product of a previous attenuation term (previous Qtrn) and the indirect intake ratio kw2 according to Equation (1) given below (step S170). The attenuation term Qtrn may be calculated according to Equation (2) given below from the direct intake ratio kw1, the amount of change in wall surface deposition ΔQmw and the is intake ratio kw2. After calculating the correction value Qfmw, the engine ECU 24 adds the calculated correction value Qfmw to the base amount of fuel injection Qftmp to compute a target amount of fuel injection Qf* (step S160). The engine ECU 24 then controls the fuel injection valve 126 to perform fuel injection of the target amount of fuel injection Qf* from the fuel injection valve 126 (step S190) and terminates this routine.

$$Qfmw = \Delta Qmw \cdot kw1 + \text{previous } Qtrn \cdot kw2 \quad (1)$$

$$Qtrn = \Delta Qmw \cdot (1-kw1) + \text{previous } Qtrn \cdot (1-kw2) \quad (2)$$

The following describes the processing of step S140 to estimate the amount of wall surface deposition Qmw in the fuel injection control routine of FIG. 3. According to this embodiment, this processing is performed by a wall surface deposition estimation process shown in FIG. 4.

Figure 4:
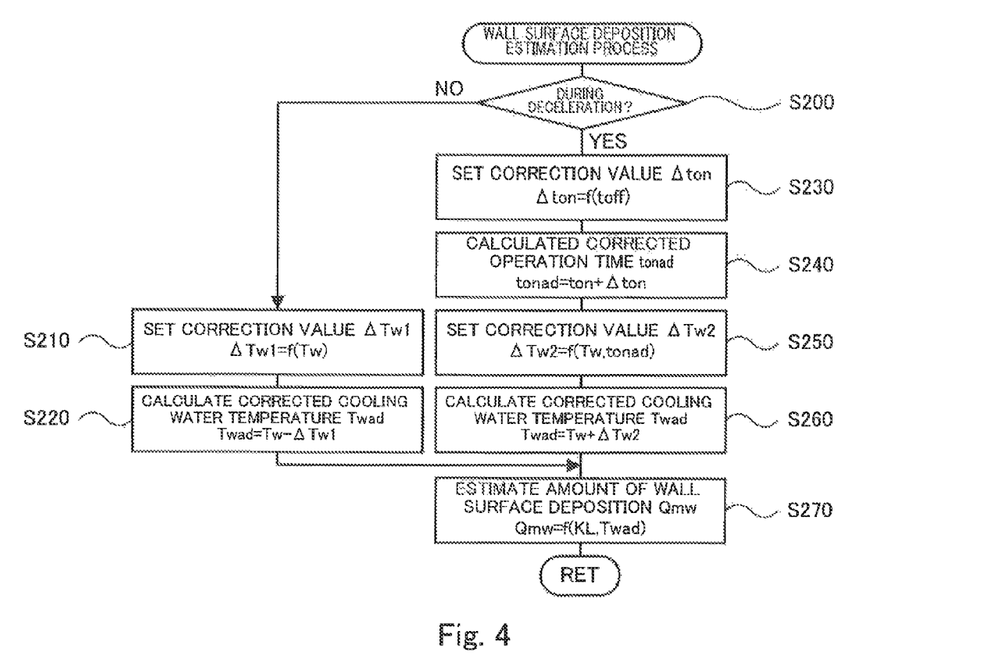
FIG. 4 is a flowchart showing one example of wall surface deposition estimation process.

In the wall surface deposition estimation process, the engine ECU 24 first determines whether the hybrid vehicle 20 is during deceleration or not (step S200). This determination may be based on the amount of change in at least one of the vehicle speed V, the throttle position TH, the intake pressure Pin, the rotation speed Ne of the engine 22 (target rotation speed Ne*) and the like.

Figure 5:
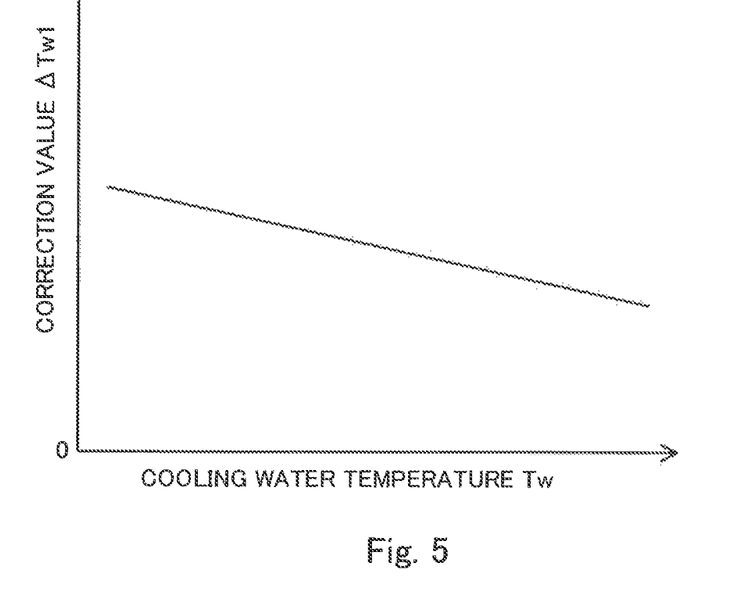
FIG. 5 is a diagram illustrating one example of a relationship of correction value ΔTw1 to cooling water temperature Tw of the engine.

When it is determined that the hybrid vehicle 20 is not during deceleration but is during acceleration or during constant speed drive, the engine ECU 24 sets a correction value ΔTw1 for correcting the cooling water temperature Tw, based on the cooling water temperature Tw of the engine 22 (step S210), and calculates a corrected cooling water temperature Twad by subtracting the set correction value ΔTw1 from the cooling water temperature Tw of the engine 22 (step S220). According to this embodiment, a procedure of setting the correction value ΔTw1 determines in advance a relationship of the correction value ΔTw1 to the cooling water temperature Tw of the engine 22 and stores the determined relationship in the form of a map in the ROM (not shown). The correction value ΔTw1 corresponding to a given cooling water temperature Tw is read from this map as a set value. One example of the relationship of the correction value ΔTw1 to the cooling water temperature Tw of the engine 22 is shown in FIG. 5. As illustrated, the correction value ΔTw1 is set to provide a larger value at the lower cooling water temperature Tw of the engine 22 than a value at the higher cooling water temperature Tw (and to provide a smaller value at the higher cooling water temperature Tw than a value at the lower cooling water temperature Tw) or, in other words, to tend to increase with a decrease in cooling water temperature Tw. The reason for such setting will be described later. Setting the correction value ΔTw1 in this manner provides a lower value as the corrected cooling water temperature Twad (=Tw−ΔTw1) during acceleration or during constant speed drive relative to the cooling water temperature Tw at the lower cooling water temperature Tw than a value at the higher cooling water temperature Tw.

Figure 6:
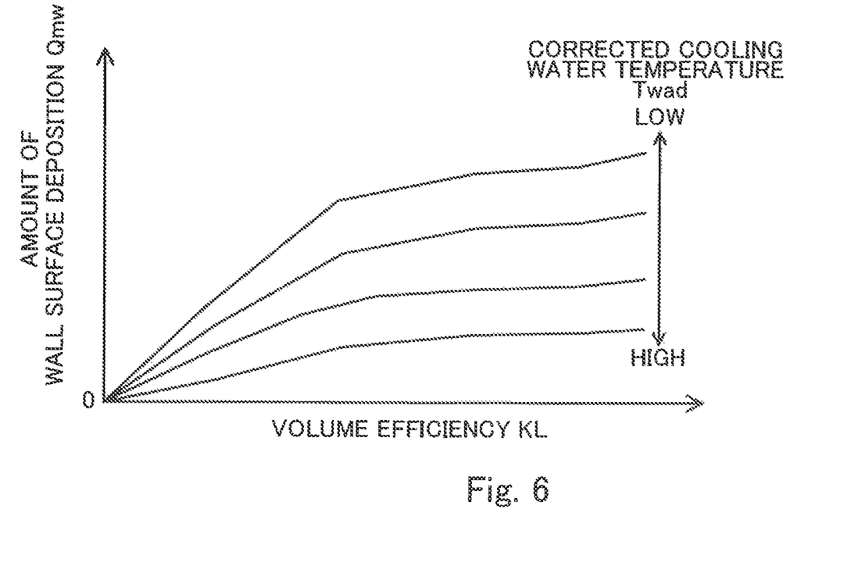
FIG. 6 is a diagram illustrating one example of a relationship of amount of wall surface deposition Qmw to volume efficiency KL and corrected cooling water temperature Twad of the engine.

The engine ECU 24 subsequently estimates the amount of wall surface deposition Qmw, based on the volume efficiency KL and the corrected cooling water temperature Twad of the engine 22 (step S270) and terminates the wall surface deposition estimation process. According to this embodiment, a procedure of estimating the amount of wall surface deposition Qmw determines in advance a relationship of the amount of wall surface deposition Qmw to the volume efficiency KL and the corrected cooling water temperature Twad of the engine 22 and stores the determined relationship in the form of a wall surface deposition estimation map in the ROM (not shown). The amount of wall surface deposition Qmw corresponding to a given volume efficiency KL and a given corrected cooling water temperature Twad of the engine 22 is read from this map as an estimated value. One example of the relationship of the amount of wall surface deposition Qmw to the volume efficiency KL and the corrected cooling water temperature Twad of the engine 22 is shown in FIG. 6. As illustrated, the amount of wall surface deposition Qmw is estimated to provide a smaller value at the lower volume efficiency KL of the engine 22 than a value at the higher volume efficiency KL (and to provide a larger value at the higher volume efficiency KL than a value at the lower volume efficiency KL) and to provide a smaller value at the higher corrected cooling water temperature Twad of the engine 22 than a value at the lower corrected cooling water temperature Twad (and to provide a larger value at the lower corrected cooling water temperature Twad than a value at the higher corrected cooling water temperature Twad). In other words, the amount of wall surface deposition Qmw is estimated to tend to decrease with a decrease in volume efficiency KL of the engine 22 and to tend to decrease with an increase in corrected cooling water temperature Twad of the engine 22. Such determination of the relationship of the amount of wall surface deposition Qmw to the volume efficiency of the engine 22 is attributed to the following reason: the lower volume efficiency KL of the engine 22 provides the lower intake pressure Pin and the lower saturated vapor pressure (the lower boiling point) and thereby increases the likelihood that the fuel is vaporized in the intake pipe 125. Such determination of the relationship of the amount of wall surface deposition Qmw to the corrected cooling water temperature Twad is attributed to the following reason: the higher cooling water temperature Tw that is used in place of the corrected cooling water temperature Twad provides the higher actual intake pipe wall temperature Tiw that is the actual temperature on the wall surface of the intake pipe 125 and thereby increases the likelihood that the fuel is vaporized in the intake pipe 125. After start of operation of the engine 22, the actual intake pipe wall temperature Tiw basically increases from about the cooling water temperature Tw to about an ordinary wall temperature Tiwst that is relatively higher than the cooling water temperature Tw (for example, by about 10° C. to 15° C.) and is then almost stabilized. After subsequent termination of the operation of the engine 22, the actual intake pipe wall temperature Tiw decreases to about the cooling water temperature Tw and is then almost stabilized. In the case of a relatively short time period between termination of previous operation of the engine 22 and start of current operation of the engine 22, the actual intake pipe wall temperature Tiw does not decrease to about the cooling water temperature Tw but starts increasing by the operation of the engine 22.

According to the embodiment, the amount of wall surface deposition Qmw during acceleration or during constant speed drive is estimated by using the corrected cooling water temperature Twad that is lower than the cooling water temperature Tw of the engine 22. Such estimation provides a larger value as the amount of wall surface deposition Qmw, compared with estimation of the amount of wall surface deposition Qmw using the cooling water temperature Tw. The larger amount of wall surface deposition Qmw is more likely to provide a larger amount of change in wall surface deposition ΔQmw (step S150), is more likely to provide a larger correction value Qfmw (step S170) and is more likely to provide a larger target amount of fuel injection Qf* (step S180) in the fuel injection control routine of FIG. 3. This ensures the sufficient acceleration performance during acceleration of the hybrid vehicle 20.

The following describes the reason for the relationship of the correction value ΔTw1 (corrected cooling water temperature Twad) to the cooling water temperature Tw of the engine 22 during acceleration or during constant speed drive. When the corrected cooling water temperature Twad of FIG. 6 is replaced by the cooling water temperature Tw of the engine 22, the amount of wall surface deposition Qmw is estimated to provide a smaller value at the higher cooling water temperature Tw of the engine 22 than a value at the lower cooling water temperature Tw. Setting a constant value to the correction value ΔTw1 irrespective of a variation in cooling water temperature Tw of the engine 22 is likely to cause estimation of the amount of wall surface deposition Qmw to be excessively affected by the correction value ΔTw1 in a range of relatively high cooling water temperature Tx of the engine 22 and to be insufficiently affected by the correction value ΔTw1 in a range of relatively low cooling water temperature Tw of the engine 22. The procedure of the embodiment takes into account this likelihood and sets the correction value ΔTw1 to provide a larger value at the lower cooling water temperature Tw of the engine 22 than a value at the higher cooling water temperature Tw as shown in FIG. 5. This provides the more appropriate correction value ΔTw1, the more appropriate corrected cooing water temperature Twad and the more appropriate amount of wall surface deposition Qmw.

Figure 7:
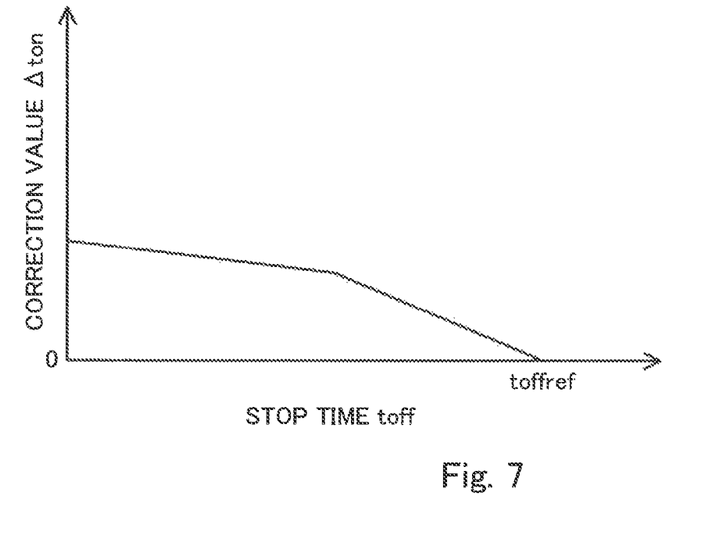
FIG. 7 is a diagram illustrating one example relationship of correction value Δton to stop time toff.

When it is determined at step S200 that the hybrid vehicle 20 is during deceleration, on the other hand, the engine ECU 24 sets a correction value Δton for correcting the operation time ton of the engine 22, based on the stop time toff of the engine 22 (step S230) and calculates a corrected operation time tonad by adding the set correction value Δton to the operation time ton (step S240). According to this embodiment, a procedure of setting the correction value Δton determines in advance a relationship of the correction value Δton to the stop time toff and stores the determined relationship in the form of a map in the ROM (not shown). The correction value Δton corresponding to a given stop time toff is read from this map as a set value. One example of the relationship of the correction value Δton to the stop time toff is shown in FIG. 7. As illustrated, the correction value Δton is set to value 0 when the stop time toff is equal to or longer than a predetermined time period toffref (for example, 50 seconds, 60 seconds or 70 seconds). When the stop time toff is shorter than the predetermined time period toffref, on the other hand, the correction value Δton is set to provide a larger value at the shorter stop time toff than a value at the longer stop time toff or in other words, to tend to increase with a decrease in stop time toff. The predetermined time period tfforef is determined by experiment or by analysis as a time period required for decreasing the actual intake pipe wall temperature Tiw from about the ordinary wall temperature Tiwst to about the cooling water temperature Tw of the engine 22 after termination of operation of the engine 22. Accordingly, the stop time toff is thought to indicate to what extent the actual intake pipe wall temperature Tiw is decreased for a time period between termination of previous operation of the engine 22 and start of current operation of the engine 22 (i.e., whether the actual intake pipe wall temperature Tiw is decreasing toward about the cooling water temperature Tw or is almost stabilized at about the cooling water temperature Tw). The corrected operation time tonad (=ton+Δton) is thought to indicate to what extent the actual intake pipe wall temperature Tiw is increased by the operation of the engine 22 (i.e. whether the actual intake pipe wall temperature Tiw is increasing toward about the ordinary wall temperature Tiwst or is almost stabilized at about the ordinary wall temperature Tiwst).

The engine ECU 24 subsequently sets a correction value ΔTw2 for correcting the cooling water temperature Tw, based on the cooling water temperature Tw and the corrected operation time tonad of the engine 22 (step S250) and calculates the corrected cooling water temperature Twad by adding the set correction value ΔTw2 to the cooling water temperature Tw of the engine 22 (step S260). The engine ECU 24 then estimates the amount of wall surface deposition Qmw by the processing of step S270 described above and terminates this routine.

Figure 8:
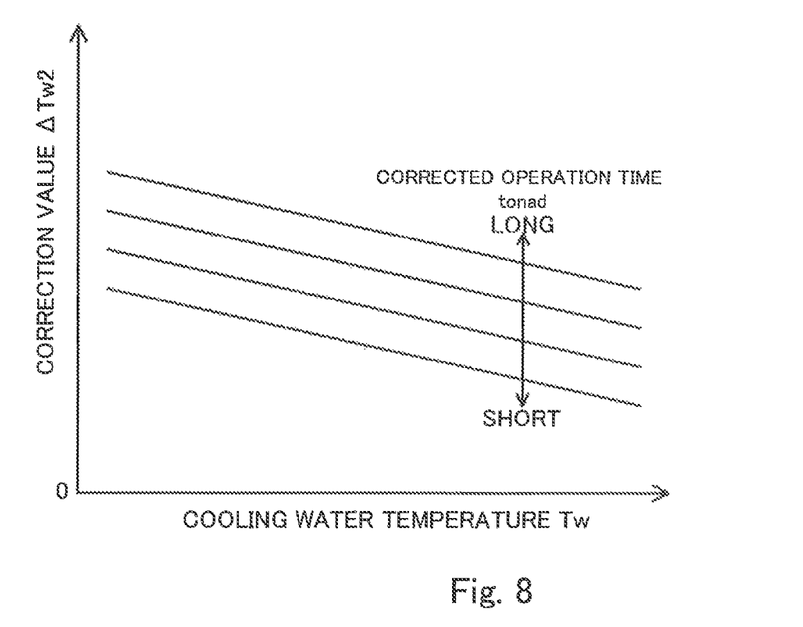
FIG. 8 is a diagram illustrating one example of a relationship of correction value ΔTw2 to cooling water temperature Tw and corrected operation time tonal of the engine.

According to this embodiment, a procedure of setting the correction value ΔTw2 determines in advance a relationship of the correction value ΔTw2 to the cooling water temperature Tw and the corrected operation time tonad of the engine 22 and stores the determined relationship in the form of a map in the ROM (not shown). The correction value ΔTw2 corresponding to a given cooling water temperature Tw and a given corrected operation time tonad is read from this map as a set value. One example of the relationship of the correction value Δtw2 to the cooling water temperature Tw and the corrected operation time tonad of the engine 22 is shown in FIG. 8. As illustrated, when the corrected operation time tonad is equal to or longer than a predetermined time period tonref, the correction value ΔTw2 is set based on only the cooling water temperature Tw (for example, values along an uppermost line among four lines in FIG. 8). When the corrected operation time tonad is shorter than the predetermined time period tonref, on the other hand, the correction value ΔTw2 is set to provide a smaller value at the shorter corrected operation time tonad than a value at the longer corrected operation time tonad or in other words, to tend to decrease with a decrease in corrected operation time tonad. The predetermined time period tonref is determined by experiment or by analysis as a time period required for increasing the actual intake pipe wall temperature Tiw from about the cooling water temperature Tw to about the ordinary wall temperature Tiwst by the operation of the engine 22. The correction value ΔTw2 is also set to provide a larger value at the lower cooling water temperature Tw of the engine 22 than a value at the higher cooling water temperature Tw (and to provide a smaller value at the higher cooling water temperature Tw than a value at the lower cooling water temperature Tw) or in other words, to tend to increase with a decrease in cooling water temperature Tw. The reason for the relationship of the correction value ΔTw2 to the cooling water temperature Tw of the engine 22 is similar to the reason for the relationship of the correction value ΔTw1 to the cooling water temperature Tw of the engine 22 during acceleration or during constant speed drive described above. The reason for the relationship of the correction value ΔTw2 to the corrected operation time tonad will be described later. Such setting of the correction value ΔTw2 causes the corrected cooling water temperature Twad (=Tw+ΔTw2) during deceleration to provide a higher value relative to the cooling water temperature Tw at the lower cooling water temperature Tw than a value at the higher cooling water temperature Tw and to provide a value closer to the cooling water temperature Tw at the shorter corrected operation time tonad than a value at the longer corrected operation time tonad. As described above with reference to FIG. 6, the amount of wall surface deposition Qmw is estimated to provide a smaller value at the lower volume efficiency KL of the engine 22 than a value at the higher volume efficiency KL (and to provide a larger value at the higher volume efficiency KL than a value at the lower volume efficiency KL) and to provide a smaller value at the higher corrected cooling water temperature Twad of the engine 22 than a value at the lower corrected cooling water temperature Twad (and to provide a larger value at the lower corrected cooling water temperature Twad than a value at the higher corrected cooling water temperature Twad). Accordingly, the relationship of the amount of wall surface deposition Qmw to the corrected operation time tonad and the corrected cooling water temperature Twad may be expressed as follows. The shorter corrected operation time tonad provides a lower corrected cooling water temperature Twad (i.e., provides a value closer to the cooling water temperature Tw) and provides a larger amount of wall surface deposition Qmw, compared with the longer corrected operation time tonad. In other words, the corrected cooling water temperature Twad increases and the amount of wall surface deposition Qmw decreases with an increase in corrected operation time tonad.

According to the embodiment, the amount of wall surface deposition Qmw during deceleration is estimated by using the corrected cooling water temperature Twad that is higher than the cooling water temperature Tw. Such estimation provides a smaller value as the amount of wall surface deposition Qmw, compared with estimation of the amount of wall surface deposition Qmw using the cooling water temperature Tw. The smaller amount of wall surface deposition Qmw is more likely to provide a smaller amount of change in wall surface deposition ΔQmw (step S150), is more likely to provide a smaller correction value Qfmw (step S170) and is more likely to provide a smaller target amount of fuel injection Qf* (step S180) in the fuel injection control routine of FIG. 3. This suppresses the air-fuel ratio from becoming rich during deceleration to some extent. Basically, the volume efficiency KL provides a lower value during deceleration than a value during acceleration or during constant speed drive. This leads to a smaller base amount of fuel injection Qftmp and a smaller target amount of fuel injection Qf*.

The following describes the reason for the relationship of the correction value ΔTw2 (corrected cooling water temperature Twad) to the corrected operation time tonad during deceleration. Setting relatively large values (for example, values along the uppermost line among the four lines in FIG. 8) to the correction value ΔTw2 during deceleration irrespective of a variation in corrected operation time tonad is likely to cause the following problems. During deceleration, in the case of a relatively short corrected operation time tonad, the actual intake pipe wall temperature Tiw is increasing toward the ordinary wall temperature Tiwst. Accompanied with an increase of the actual intake pipe wall temperature Tiw, the fuel depositing on the wall surface of the intake pipe 125 is more likely to be vaporized. This is likely to result in decreasing the actual amount of wall surface deposition. Setting relatively large values (for example, values along the uppermost line among the four lines in FIG. 8) to the correction value ΔTw2 irrespective of a variation in corrected operation time tonad causes the estimated amount of wall surface deposition Qmw to be less than the actual amount of wall surface deposition during deceleration (especially in the initial stage of deceleration). This may result in a failure to sufficiently simulate the reduction in actual amount of wall surface deposition with an increase actual intake pipe wall temperature Tiw by a variation in amount of wall surface deposition Qmw (i.e. the amount of change in wall surface deposition ΔQmw) based on the corrected cooling water temperature Twad. This is likely to fail to sufficiently reduce the amount of chance in wall surface deposition ΔQmw and sufficiently reduce the target amount of fuel injection Qf* and is thereby likely to provide the rich air-fuel ratio. The rich air-fuel ratio during deceleration results in increasing the amount of non-combusted fuel. Idling operation prior to termination of operation of the engine 22 is likely to cause the poor emission, for example, immediately after a next start of operation of the engine 22. According to the embodiment, however, when the corrected operation time tonad is shorter than the predetermined time period tonref, the correction value ΔTw2 is set to provide a smaller value at the shorter corrected operation time tonad than a value at the longer corrected operation time tonad. This causes the corrected cooling water temperature Twad to provide a value closer to the cooling water temperature Tw of the engine 22 at the shorter corrected operation time tonad than a value at the longer corrected operation time tonad and results in increasing the amount of wall surface deposition Qmw. An increase in the corrected operation time tonad causes an increase in the correction value ΔTw2 an increase in the corrected cooling water temperature Twad and a decrease in the amount of wall surface deposition Qmw. Compared with setting relatively large values to the correction value ΔTw2 irrespective of a variation in corrected operation time tonad, the setting of the embodiment is more likely to decrease the amount of change in wall surface deposition ΔQmw to the smaller value and is more likely to decrease the target amount of fuel injection Qf* to the smaller value during deceleration when the corrected operation time tonad is shorter than the predetermined time period tonref. This more effectively suppresses the air-fuel ratio from becoming rich during deceleration, thus more effectively suppressing an increase of the non combusted fuel and suppressing the poor emission. According to the embodiment, when the corrected operation time tonad is shorter than the predetermined time period tonref, the relationship of the correction value ΔTw2 to the corrected operation time tonad shown in FIG. 8 is determined in advance by experiment or by analysis, in order to enable a change in actual amount of wall surface deposition during an increase in the actual intake pipe wall temperature Tiw toward about the ordinary wall temperature Tiwst to be sufficiently simulated by the variation in amount of wall surface deposition Qmw (i.e., the amount of change in wall surface deposition ΔQmw) based on the corrected operation time tonad. When the corrected operation time ton is equal to or longer than the predetermined time period tonref, on the other hand, the actual intake pipe wall temperature Tiw is expected to be almost stabilized at about the ordinary wall temperature Tiwst. This is unlikely to provide a significant change in actual amount of wall surface deposition with a change in actual intake pipe wall temperature Tiw. Accordingly, any significant problem is unlikely to arise by setting values based on only the cooling water temperature Tw (for example, values along the uppermost line among the four lines in FIG. 8) to the correction value ΔTw2.

Figure 9:
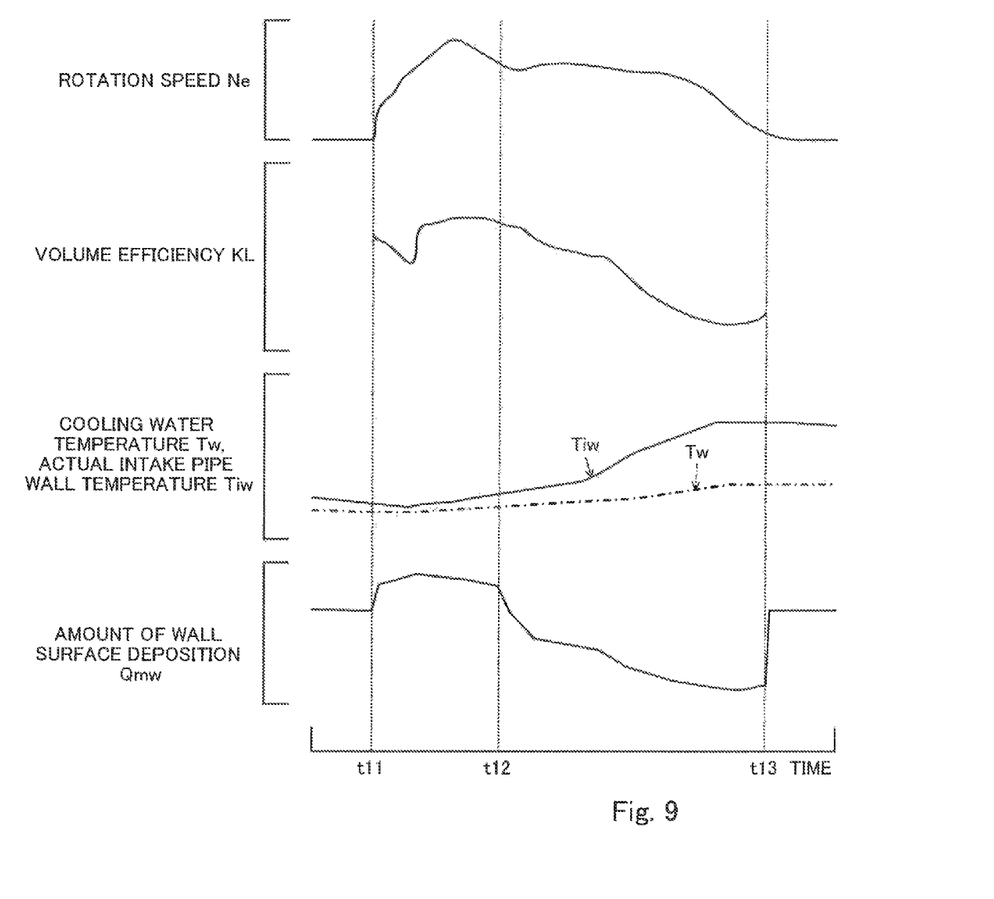
FIG. 9 is a diagram illustrating one example of variations during operation of the engine.

FIG. 9 is a diagram illustrating one example of variations during operation of the engine 22. As illustrated, the engine 22 starts operation at a time t11. The vehicle starts deceleration at a time t12 after elapse of a relatively short time period since the time t11. Such deceleration increases the reduction in the amount of wall surface deposition Qmw per unit time (per interval of execution of this routine) accompanied with a decrease of the volume efficiency KL and an increase of the corrected cooling water temperature Twad (=Tw+ΔTw2) caused by an increase of the cooling water temperature Tw and an increase of the correction value ΔTw2 at the relatively shorter operation time ton. This results in sufficiently reducing the amount of change in wall surface deposition ΔQmw, sufficiently reducing the correction value Qfmw and sufficiently reducing the target amount of fuel injection Qf*. This more effectively suppresses the air-fuel ratio from becoming rich during deceleration having the relatively short corrected operation time tonad of the engine 22. This more effectively suppresses the poor emission caused by an increase of the non-combusted fuel during deceleration. The engine 22 terminates operation at a subsequent time t13.

As described above, the hybrid vehicle 20 of the embodiment performs fuel injection control using the smaller target amount of fuel injection *Qf during deceleration with operation of the engine 22, compared with the target amount of fuel injection *Qf during acceleration or during constant speed drive with operation of the engine 22. During deceleration with operation of the engine 22, the amount of wall surface deposition Qmw is estimated to provide a larger value at the shorter corrected operation time tonad than a value at the longer corrected operation time tonad. The target amount of fuel injection *Qf is set by adding the correction value Qfmw to the base amount of fuel injection Qftmp. The correction value Qfmw is set to reduce the target amount of fuel injection *Qf in the case of the larger reduction in the amount of wall surface deposition Qmw per unit time than in the case of the smaller reduction in the amount of wall surface deposition Qmw per unit time. This more effectively suppresses the air-fuel ratio from becoming rich during deceleration having the relatively short corrected operation time tonad of the engine 22. This more effectively suppresses the poor emission caused by an increase of the non-combusted fuel during deceleration.

In the hybrid vehicle 20 of the embodiment, the correction value ΔTw2 used during deceleration with operation of the engine 22 is set by using the cooling water temperature Tw and the corrected operation time tonad of the engine 22. According to a modification, the correction value ΔTw2 may be set by using only the corrected operation time tonad of the engine 22. According to another modification, the correction value ΔTw2 may be set by using the operation time ton in place of the corrected operation time tonad.

In the hybrid vehicle 20 of the embodiment, the amount of wall surface deposition Qmw is set by using the volume efficiency KL and the cooling water temperature Tw of the engine 22. According to a modification, the amount of wall surface deposition Qmw may be set by using, for example, the rotation speed Ne of the engine 22, in addition to the volume efficiency KL and the cooling water temperature Tw. In this modification, the relationship of the amount of wall surface deposition Qmw to the rotation speed Ne of the engine 22 may be set to provide a larger value as the amount of wall surface deposition Qmw at the higher rotation speed Ne of the engine 22 than a value at the lower rotation speed Ne.

In the hybrid vehicle 20 of the embodiment, the correction value ΔTw2 is set to provide a smaller value at the shorter corrected operation time tonad of the engine 22 than a value at the longer corrected operation time tonad, and the amount of wall surface deposition Qmw is estimated to provide a larger value at the lower corrected cooing water temperature Twad (=Tw−ΔTw2) based on this correction value ΔTw2 than a value at the higher corrected cooling water temperature Twad. The requirement is, however, to estimate the amount of wall surface deposition Qmw such as to increase with a decrease in corrected operation time tonad or a decrease in operation time ton of the engine 22. According to a modification, the amount of wall surface deposition Qmw may be estimated directly according to the corrected operation time tonad of the engine 22 without setting the correction value ΔTw2 and the corrected cooling water temperature Twad.

Figure 10:
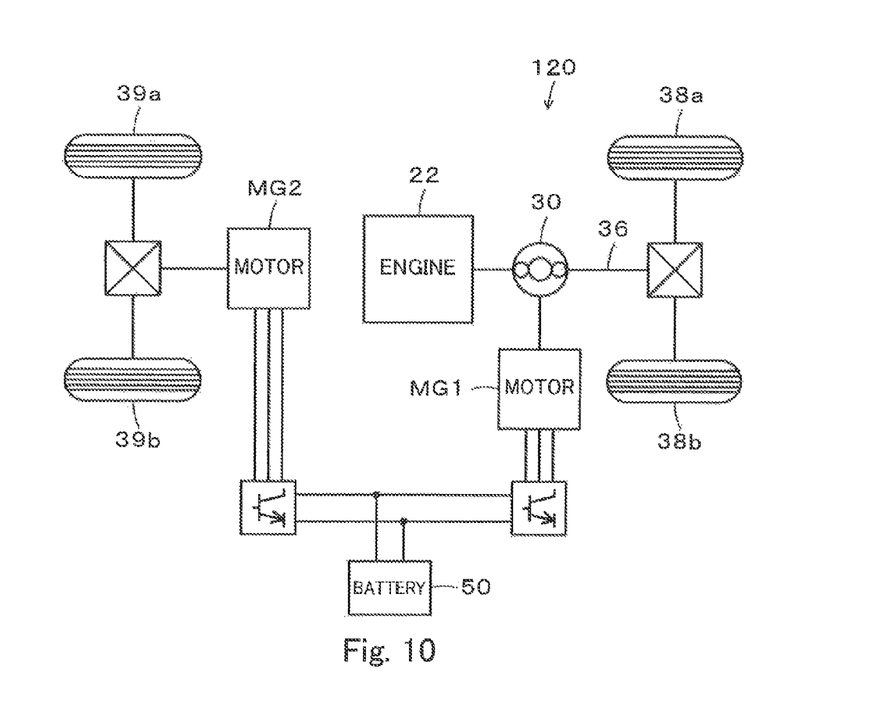
FIG. 10 is a configuration diagram illustrating the schematic configuration of another hybrid vehicle according to a modification.

The hybrid vehicle 20 of the embodiment is configured such that the power from the motor MG2 is output to the driveshaft 36 linked with the drive wheels 38a and 38b. The invention may, however, be also applied to a configuration that the power from the motor MG2 is output to another axle (axle linked with wheels 39a and 39b in FIG. 10) that is different from an axle connected with a driveshaft 36 (axle linked with drive wheels 38a and 38b) as illustrated by a hybrid vehicle 120 of a modification in FIG. 10.

Figure 11:
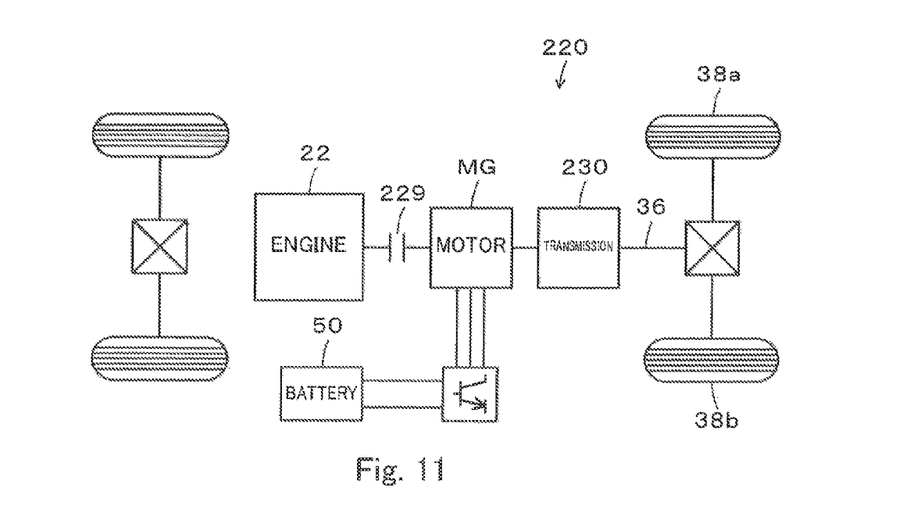
FIG. 11 is a configuration diagram illustrating the schematic configuration of another hybrid vehicle according to another modification.

The hybrid vehicle 20 of the embodiment is configured such that the power from the engine 22 is output via the planetary gear 30 to the driveshaft 36 linked with the drive wheels 38a and 38b and that the power from the motor MG2 is output to the driveshaft 36. The invention may, however, be also applied to a configuration that a motor MG is connected via a transmission 230 with a driveshaft 36 linked with drive wheels 38a and 38b and that an engine 22 is connected via a clutch 229 with a rotating shaft of the motor MG as illustrated by a hybrid vehicle 220 of another modification in FIG. 11. In this configuration, the power from the engine 22 is output to the driveshaft 36 via the rotating shaft of the motor MG1 and the transmission 230, and the power from the motor MG is output to the driveshaft 36 via the transmission 230.

In the hybrid vehicle of the invention, during the predetermined deceleration, the controller may set a water temperature correction value to provide a smaller value at a shorter operation time of the engine than a value at a longer operation time, set a corrected cooling water temperature by adding the water temperature correction value to a cooling water temperature of the engine and estimate the amount of wall surface deposition to provide a larger value at a lower corrected cooling water temperature than a value at a higher corrected cooling water temperature. In the hybrid vehicle of the invention, during the predetermined deceleration, the controller may set the water temperature correction value such as to provide a smaller value at a shorter operation time of the engine than a value at a longer operation time and to provide a smaller value at a higher cooling water temperature of the engine than a value at a lower cooling water temperature. This enables the correction value of water temperature to be set more appropriately.

In the hybrid vehicle of the invention, during the predetermined deceleration, the controller may estimate the amount of wall surface deposition such as to provide a larger value at a shorter operation time of the engine than a value at a longer operation time and to provide a larger value at a higher volume efficiency of the engine than a value at a lower volume efficiency.

In the hybrid vehicle of the invention, during the predetermined deceleration, the controller may set a sum of a time elapsed since start of current operation of the engine and a time correction value that is set to provide a larger value at a shorter time period between termination of previous operation of the engine and start of current operation of the engine than a value at a longer time period, to the operation time of the engine. This enables the amount of wall surface deposition to be estimated more appropriately. During the predetermined deceleration, the controller may set a time elapsed since start of current operation of the engine to the operation time of the engine.

The hybrid vehicle of the invention may include a generator and a planetary gear that is configured to have three rotational elements respectively connected with a driveshaft linked with an axle, an output shaft of the engine and a rotating shaft of the generator. The motor may be configured to input and output power into and from the driveshaft.

The following describes the correspondence relationship between the primary components of the embodiments and the primary components of the invention described in Summary of Invention. The engine 22 of the embodiment corresponds to the "engine", and the motor MG2 corresponds to the "motor". The UVECU 70, the engine ECU 24 and the motor ECU 40 correspond to the "controller".

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable to, for example, manufacturing industries of hybrid vehicles.

The invention claimed is:
1. A hybrid vehicle, comprising:
an engine that is provided with a fuel injection valve to inject a fuel into an intake pipe and is configured to output a power for driving;
a motor that is configured to output a power for driving; and
a controller that is configured to control the engine and the motor so as to drive the hybrid vehicle with intermittent operation of the engine, wherein
the controller sets a target amount of fuel injection so as to provide a smaller value during a predetermined deceleration that is during deceleration of the hybrid vehicle with operation of the engine than a value during no-deceleration with operation of the engine, and controls the engine to perform fuel injection with the target amount of fuel injection from the fuel injection valve,
during the predetermined deceleration, the controller sets a sum of a base amount of fuel injection and a correction value that is set to reduce the target amount of fuel injection in a case of a larger reduction in amount of wall surface deposition per unit time than in a case of a smaller reduction in amount of wall surface deposition per unit time, to the target amount of fuel injection, wherein the amount of wall surface deposition denotes an amount of fuel depositing on a wall surface of the intake pipe, and
during the predetermined deceleration, the controller estimates the amount of wall surface deposition to provide a larger value at a shorter operation time of the engine than a value at a longer operation time.
2. The hybrid vehicle according to claim 1,
wherein during the predetermined deceleration, the controller sets a water temperature correction value to provide a smaller value at a shorter operation time of the engine than a value at a longer operation time, sets a corrected cooling water temperature by adding the water temperature correction value to a cooling water temperature of the engine and estimates the amount of wall surface deposition to provide a larger value at a lower corrected cooling water temperature than a value at a higher corrected cooling water temperature.

3. The hybrid vehicle according to claim 2,
wherein during the predetermined deceleration, the controller sets the water temperature correction value so as to provide a smaller value at a shorter operation time of the engine than a value at a longer operation time and to provide a smaller value at a higher cooling water temperature of the engine than a value at a lower cooling water temperature.

4. The hybrid vehicle according to claim 1,
wherein during the predetermined deceleration, the controller estimates the amount of wall surface deposition so as to provide a larger value at a shorter operation time of the engine than a value at a longer operation time and to provide a larger value at a higher volume efficiency of the engine than a value at a lower volume efficiency.

5. The hybrid vehicle according to claim 1,
wherein during the predetermined deceleration, the controller sets a sum of a time elapsed since start of current operation of the engine and a time correction value that is set to provide a larger value at a shorter time period between termination of previous operation of the engine and start of current operation of the engine than a value at a longer time period, to the operation time of the engine.

\* \* \* \* \*